United States Patent
Siebert et al.

(10) Patent No.: US 9,613,733 B2
(45) Date of Patent: Apr. 4, 2017

(54) METHOD FOR JACKETING ELONGATE MATERIAL, ESPECIALLY LEADS OR CABLE LOOMS

(71) Applicant: tesa SE, Hamburg (DE)

(72) Inventors: Michael Siebert, Schenefeld (DE); Alexander Prenzel, Hamburg (DE)

(73) Assignee: TESA SE, Norderstedt (DE)

( * ) Notice: Subject to any disclaimer, the term of this patent is extended or adjusted under 35 U.S.C. 154(b) by 48 days.

(21) Appl. No.: 14/328,780

(22) Filed: Jul. 11, 2014

(65) Prior Publication Data

US 2015/0013875 A1 Jan. 15, 2015

(30) Foreign Application Priority Data

Jul. 12, 2013 (DE) .......................... 10 2013 213 726

(51) Int. Cl.
*H01B 13/012* (2006.01)
*H01B 13/00* (2006.01)
(Continued)

(52) U.S. Cl.
CPC ............ *H01B 13/0013* (2013.01); *C09J 5/04* (2013.01); *C09J 7/043* (2013.01);
(Continued)

(58) Field of Classification Search
CPC .................................................. H01B 13/012
(Continued)

(56) References Cited

U.S. PATENT DOCUMENTS 3,657,379 A * 4/1972 Hilbelink ............... C08G 59/18
156/327
3,837,981 A * 9/1974 Flint ....................... B32B 27/00
156/330

(Continued)

FOREIGN PATENT DOCUMENTS

DE 21 15 537 A1 10/1972
DE 2 131 256 A1 1/1973
(Continued)

OTHER PUBLICATIONS

Machine translation of EP 647691, date unknown.*
(Continued)

*Primary Examiner* — Jeff Aftergut
(74) *Attorney, Agent, or Firm* — Norris McLaughlin & Marcus, P.A.

(57) ABSTRACT

Method for jacketing elongate material such as more particularly leads or cable looms, where
an adhesive tape comprising a carrier, more particularly textile carrier with a curative composition applied to its top side and a reactive composition to its bottom side, is passed in a helical line around the elongate material, or the elongate material is wrapped in the axial direction by the adhesive tape in such a way that the curative composition and the reactive composition come into contact,
the elongate material together with the adhesive tape wrapping is brought into the desired disposition, more particularly into the cable loom layout,
the elongate material is held in this disposition,
the curative composition reacts with the reactive composition, to produce a curing layer of composition.

8 Claims, 5 Drawing Sheets

(51) Int. Cl.
*C09J 5/04* (2006.01)
*C09J 7/04* (2006.01)

(52) U.S. Cl.
CPC .... *C09J 2203/302* (2013.01); *C09J 2400/263* (2013.01); *C09J 2433/00* (2013.01); *C09J 2463/00* (2013.01)

(58) Field of Classification Search
USPC .......................................................... 156/53
See application file for complete search history.

(56) References Cited

U.S. PATENT DOCUMENTS

| | | | |
|---|---|---|---|
| 4,622,260 | A | 11/1986 | Tesch |
| 6,936,553 | B2 | 8/2005 | Von Samson-Himmelstjerna |
| 7,132,028 | B1 * | 11/2006 | Wahlers-Schmidlin H02G 3/0481 156/184 |
| 7,282,250 | B2 | 10/2007 | Musahl et al. |
| 2003/0068945 | A1 | 4/2003 | Samson-Himmelstjerna |
| 2003/0198806 | A1 | 10/2003 | Samson-Himmelstjerna et al. |
| 2004/0253889 | A1 | 12/2004 | Mundt |
| 2005/0115664 | A1 | 6/2005 | Musahl et al. |
| 2006/0231192 | A1 | 10/2006 | Wahlers-Schmidlin et al. |
| 2007/0071976 | A1 | 3/2007 | Wahlers-Schmidlin et al. |
| 2009/0311473 | A1 | 12/2009 | Husemann et al. |
| 2012/0027986 | A1 | 2/2012 | Husemann et al. |
| 2013/0273333 | A1 * | 10/2013 | Meier ................. B60R 16/0215 428/189 |
| 2013/0344323 | A1 | 12/2013 | Fuji et al. |

FOREIGN PATENT DOCUMENTS

| | | |
|---|---|---|
| DE | 39 40 292 A1 | 6/1991 |
| DE | 102 02 454 A1 | 7/2003 |
| DE | 102 29 527 A1 | 1/2004 |
| DE | 102 59 457 A1 | 12/2004 |
| DE | 103 29 994 A1 | 1/2005 |
| DE | 10 2006 042 816 A1 | 6/2008 |
| DE | 10 2009 006 935 A1 | 8/2010 |
| DE | 202010003210 U1 * | 1/2012 |
| DE | 10 2011 005 200 A1 | 9/2012 |
| EP | 0 071 212 B1 | 2/1983 |
| EP | 0647691 A1 * | 4/1995 |
| EP | 1 300 452 A2 | 4/2003 |
| EP | 1 312 097 A1 | 5/2003 |
| EP | 1 315 781 A1 | 6/2003 |
| EP | 1 367 608 A2 | 12/2003 |
| EP | 1 448 744 A1 | 8/2004 |
| EP | 2 497 805 A1 | 9/2012 |
| GB | 481593 A * | 3/1938 |
| JP | 2012 197427 A | 10/2012 |
| WO | 02 18509 A1 | 3/2002 |
| WO | 2006/108871 A1 | 10/2006 |
| WO | WO-2012/048912 A1 * | 4/2012 |

OTHER PUBLICATIONS

European Search Report issued in corresponding EP Application No. 14 17 6675 Dec. 16, 2014.

German Search Report issued in corresponding German Application No. 10 2013 213 726.5 issued Mar. 7, 2014.

* cited by examiner

METHOD FOR JACKETING ELONGATE MATERIAL, ESPECIALLY LEADS OR CABLE LOOMS

This application claims priority of German Patent Application No. 10 2013 213 726.5, filed Jul. 12, 2013, the contents of which are incorporated herein by reference.

The invention relates to a method for jacketing elongate material such as more particularly leads or cable looms.

Adhesive tapes have long been used in industry for producing cable harnesses. In this utility the adhesive tapes serve to bundle a multiplicity of electrical leads prior to installation or in already assembled state, in order to reduce the space taken up by the bundle of leads, by bandaging them, and also, in addition, to obtain protective functions.

Widely encountered are cable wrapping tapes with film and textile carriers, which in general are coated on one side with various pressure-sensitive adhesives.

Fundamentally, present cable looms wrapped with adhesive tape are initially flexible. In order to hold the individual strands of the cable loom in a particular form, to allow them to be guided around the engine, without making contact with it, in the engine compartment, for example, it is usual to use injection-moulded components that are attached subsequently.

A fundamental drawback of these injection-moulded components is that additional expenditure on material and on assembly is entailed.

In the event of changes to the cable loom routing, a new mould must be produced for such injection-moulded components, and this gives rise to considerable extra cost. This is especially the case when subsequent changes are made to the cable loom routing, as is a regular occurrence as part of the "facelifting" of more modern motor vehicles.

The textbook "Faserverbund-Kunststoffe" [Fibre composite plastics] by G. W. Ehrenstein, Hanser, 2006, ISBN 3-446-22716-4 discloses the use of fibres (especially glass fibres or polyester fibres) in combination with resins (especially epoxy resins) for producing fibre composite plastics.

EP 2 497 805 A1 describes an adhesive tape which finds use for the jacketing of elongate material such as cable looms in an automobile. The adhesive tape consists of a carrier with a top face and a bottom face, the carrier having a width $B_T$ relative to the transverse direction, and having on at least one longitudinal edge of the carrier an adhesive strip comprising a reactive, heat-activatable adhesive, with a width $B_K$ of at least 3 mm and of not more than 50% of the width $B_T$.

For jacketing, the elongate material is wrapped in the axial direction by the adhesive tape. The reactive, curing adhesive leads to a flexible tube with very high fastening strength, since a "structural bond" is formed, but not a stiff, shaping assembly.

2-Component adhesive bonding systems are known and are described in detail in the technical literature. In these systems, an adhesive system consisting of two components is applied to the parts that are to be bonded, with the use of two liquid components being customary. In the case of chemically reacting 2-component polymerization adhesive bonding systems, for example, one component consists of the monomer to be polymerized and an activator and the other component consists of a radical-forming substance (also called curing agent, curative or initiator) and of the monomer to be polymerized. After the two components have been thoroughly mixed, or at least contacted, and after activation, which is usually accomplished thermally, the radical-forming substance is cleaved by the activator into two radicals, and the polymerization reaction of the monomers to be polymerized commences. The radical chain polymerization of the monomer occurs subsequently until there is chain termination, and the adhesive composition hardens fully, thereby producing a permanent adhesive bond between the parts to be bonded.

It is an object of the present invention to provide a method that allows particularly simple, inexpensive and quick jacketing of elongate material such as, more particularly, leads or cable looms, and that leads to a stiffened jacketed material.

This object is achieved by means of a method as described hereinbelow.

The invention provides a method for jacketing elongate material such as more particularly leads or cable looms, where an adhesive tape comprising a textile carrier and a curable adhesive applied to at least one side of the carrier is passed in a helical line around the elongate material, or the elongate material is wrapped in the axial direction by the adhesive tape, the elongate material together with the adhesive tape wrapping is brought into the desired disposition, more particularly into the cable loom layout, the elongate material is held in this disposition, the curable adhesive is brought to cure by the supply of radiant energy such as heat.

A cable loom layout corresponds to the actual spatial disposition of the individual cable strands in the cable loom—that is, which cable strand is bent at which point in which angle, where positions of branches or outbindings are located, and which plugs are fitted to the ends of the cable strands.

In accordance with another embodiment of the invention, the curative composition and/or the reactive composition are applied to the carrier, more particularly the textile carrier, in at least one stripe extending in the longitudinal direction of the adhesive tape. In that case, curative composition and at the same time reactive composition are preferably applied each in one stripe. With further preference, the stripe of curative composition extends from one longitudinal edge of the carrier to the middle of the carrier, and the stripe of the reactive composition extends from the opposite edge of the carrier to the middle of the carrier.

A preferred embodiment is that in which curative composition and reactive composition have been applied over the full area of the carrier.

With further preference there may be a release film present between the carrier and the reactive composition.

A preferred carrier material is a textile carrier.

In principle, in the course of coating a textile carrier, any viscous composition penetrates the textile carrier so as to be able to be anchored in it. In this process, the composition flows around the individual fibres or yarns, and so the layer of composition can no longer be separated from the carrier.

The anchoring is typically so strong that an adhesive tape of this kind can be readily unwound from a roll without the anchoring of the composition tearing and so-called transfer of the composition occurring (the composition in that case is on the reverse face of the carrier). Furthermore, it is expected of the majority of pressure-sensitive adhesive tapes that they can be detached again from the substrate—that is, can be taken up again as far as possible without trace. This means the adhesive tape must not fracture adhesively between carrier and composition.

In the text below, the curative composition and the reactive composition are referred to collectively as compositions. If it is said that the compositions have penetrated the carrier, this means that only the curative composition, or only the reactive composition, or the curative composition and the reactive composition at the same time, has or have penetrated into the carrier. The latter version is preferred.

According to one preferred embodiment of the invention, compositions, following application to the carrier, have sunken into the carrier to an extent of more than 10%, preferably more than 25%.

A numerical figure of 25% here, for example, means that the composition has penetrated over a layer thickness of 25% of the thickness of the textile carrier, i.e., in the case of a carrier having a thickness of 100 µm, over a layer thickness of 25 µm there is composition within the carrier, this figure being applied starting from the surface of the carrier to which the composition has been coated, and in perpendicular direction with respect to the plane defined by the longitudinal or transverse direction, respectively.

According to one preferred embodiment, the amount of coated composition is selected such that there is still a good part of the partially sunken-in layer of composition projecting above the carrier.

The thickness of the non-sunken-in layer of composition is preferably more than 25 µm, more preferably more than 50 µm, more preferably more than 100 µm.

After curing, more particularly after thermally induced curing, the contacting of curative composition and reactive composition leads to a structural bond and hence to stiffening of the carrier, with the position of the carrier fibres or threads being fixed relative to one another.

With further preference, the carrier, after the compositions have been applied, is saturated completely—that is, over 100% of the carrier thickness—with the compositions, and so all of the carrier fibres are fixed. With this variant of the invention as well, the amount of composition applied can be selected so that still a partial layer of the compositions projects above the carrier.

According to one embodiment, the adhesive tape is passed in a helical line around the elongate material. The wrapping is preferably done such that the new ply of adhesive tape overlaps the one located below it partially, preferably to an extent of 50%.

With further preference the adhesive tape may be passed a second time around the material. This second wrapping preferably takes place likewise in the form of a helical line, preferably with an offset. Wrapping in this case may take place in the same direction as the first wrapping, in other words likewise from left to right, but may also take place in the opposite direction.

In one particularly advantageous adhesive tape the carrier used is a woven, nonwoven or knitted fabric.

Adhesive tapes with carriers of these kinds can be torn into by hand with relative convenience, and this is likewise of particular importance for the described utility and the particularly preferred processing as a wrapping tape for bundling cables in automobiles.

A tensile strength in transverse direction of less than 10 N, determined in accordance with the AFERA standard 4007, serves as a criterion for the hand tearability of the adhesive tape. Only in the case of very high basis weights or thicknesses on the part of the carriers employed is it possible that the hand tearability may not exist or may be limited. In that case, however, perforations may be present in order to optimize the hand tearability.

As carrier it is possible to use all known textile carriers such as knitted fabrics, scrims, tapes, braids, tufted textiles, felts, woven fabrics (encompassing plain weave, twill and satin weave), knitted fabrics (encompassing warp knits and other knits) or nonwoven webs, the term "nonwoven web" comprehending at least sheetlike textile structures in accordance with EN 29092 (1988) and also stitchbonded webs and similar systems.

It is likewise possible to use woven and knitted spacer fabrics with lamination.

Spacer fabrics of these kinds are disclosed in EP 0 071 212 B1. Spacer fabrics are mat-like layer structures comprising a cover layer of a fibre or filament web, an underlayer and individual retaining fibres or bundles of such fibres between these layers, these fibres being distributed over the area of the layer structure, being needled through the particle layer and joining the cover layer and the underlayer to one another. As an additional although not mandatory feature, the retaining fibres in accordance with EP 0 071 212 B1 contain particles of inert minerals, such as sand, gravel or the like, for example.

The retaining fibres needled through the particle layer hold the cover layer and the underlayer at a distance from one another and are joined to the cover layer and the underlayer.

Nonwovens contemplated include, in particular, consolidated staple fibre webs, but also filament webs, meltblown webs and spunbonded webs, which generally require additional consolidation. Possible consolidation methods known for webs include mechanical, thermal and chemical consolidation. Whereas with mechanical consolidations the fibres are held together purely mechanically usually by entanglement of the individual fibres, by the interlooping of fibre bundles or by the stitching-in of additional threads, it is possible by thermal and by chemical techniques to obtain adhesive (with binder) or cohesive (binderless) fibre-fibre bonds. Given appropriate formulation and an appropriate process regime, these bonds may be restricted exclusively, or at least predominantly, to fibre nodal points, so that a stable, three-dimensional network is formed while nevertheless retaining the relatively loose, open structure in the web.

Webs which have proved to be particularly advantageous are those consolidated in particular by overstitching with separate threads or by interlooping.

Consolidated webs of this kind are produced for example on stitchbonding machines of the "Malimo" type from the company Karl Mayer, formerly Malimo, and can be obtained from companies including Hoftex Group AG. A Malifleece is characterized in that a cross-laid web is consolidated by the formation of loops from fibres of the web.

The carrier used may also be a web of the Kunit or Multiknit type. A Kunit web is characterized in that it originates from the processing of a longitudinally oriented fibre web to form a sheetlike structure which has loops on one side and has loop feet or pile fibre folds on the other side, but possesses neither threads nor prefabricated sheetlike structures. A web of this kind as well has been produced for a relatively long time, for example on stitchbonding machines of the "Malimo" type from the company Karl Mayer. A further characterizing feature of this web is that, as a longitudinal-fibre web, it is able to absorb high tensile forces in the longitudinal direction. The characteristic feature of a Multiknit web relative to the Kunit web is that the web is consolidated on both the top and bottom sides by virtue of the double-sided needle punching. The starting product used for a Multiknit is generally one or two single-sidedly interlooped pile fibre nonwovens produced by the Kunit process. In the end product, both top sides of the nonwovens are shaped by means of interlooped fibres to form a closed surface, and are joined to one another by fibres which stand almost perpendicularly. An additional possibility is to introduce further needleable sheetlike structures and/or scatterable media.

Finally, stitchbonded webs as an intermediate are also suitable for forming a carrier of the invention and an adhesive tape of the invention. A stitchbonded web is formed from a nonwoven material having a large number of stitches extending parallel to one another. These stitches are brought about by the stitching-in or stitchbonding of continuous textile threads. For this type of web, stitchbonding machines of the "Malimo" type from the company Karl Mayer are known.

Also particularly suitable are needlefelt webs. In a needlefelt web, a tuft of fibres is made into a sheetlike structure by means of needles provided with barbs. By alternate introduction and withdrawal of the needles, the material is consolidated on a needle bar, with the individual fibres interlooping to form a firm sheetlike structure. The number and configuration of the needling points (needle shape, penetration depth, double-sided needling) determine the thickness and strength of the fibre structures, which are in general lightweight, air-permeable and elastic.

Also particularly advantageous is a staple fibre web which is mechanically preconsolidated in the first step or is a wet-laid web laid hydrodynamically, in which between 2% and 50% by weight of the web fibres are fusible fibres, more particularly between 5% and 40% by weight of the web fibres.

A web of this kind is characterized in that the fibres are laid wet or, for example, a staple fibre web is preconsolidated by the formation of loops from fibres of the web by needling, stitching, air-jet and/or water-jet treatment.

In a second step, thermofixing takes place, with the strength of the web being increased again by the melting, or partial melting, of the fusible fibres.

For the utilization of nonwovens in accordance with the invention, the adhesive consolidation of mechanically preconsolidated or wet-laid webs is of particular interest, it being possible for said consolidation to take place by way of the addition of binder in solid, liquid, foamed or paste-like form. A great diversity of theoretical presentation forms is possible—for example, solid binders as powders for trickling in; as a sheet or as a mesh; or in the form of binding fibres. Liquid binders may be applied as solutions in water or organic solvents, or as a dispersion. For adhesive consolidation, binding dispersions are predominantly selected: thermosets in the form of phenolic or melamine resin dispersions, elastomers as dispersions of natural or synthetic rubbers or, usually, dispersions of thermoplastics such as acrylates, vinyl acetates, polyurethanes, styrene-butadiene systems, PVC, and the like, and also copolymers thereof. Normally the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" [Nonwovens] (Georg Thieme Verlag, Stuttgart, 1982) or "Textiltechnik-Vliesstofferzeugung" [Textile Technology—Producing Nonwovens] (Arbeitgeberkreis Gesamttextil, Eschborn, 1996).

For sufficient adhesive consolidation of the web carrier, the addition of binder in the order of magnitude of 1% to 50%, more particularly 3% to 20%, based on the weight of the fibre web, is generally required.

The binder may be added as early as during the manufacture of the web, in the course of mechanical preconsolidation, or else in a separate process step, which may be carried out in-line or off-line. Following the addition of binder, it is necessary temporarily to generate a condition for the binder in which the binder becomes adhesive and adhesively connects the fibres—this may be achieved during the drying, for example, of dispersions, or else by means of heating, with further possibilities for variation existing by way of areal or partial application of pressure. The binder may be activated in known drying tunnels, given an appropriate selection of binder, or else by means of infra-red radiation, UV radiation, ultra-sound, high-frequency radiation or the like. For the subsequent end use it is sensible, though not absolutely necessary, for the binder to have lost its tack following the end of the web production process. It is advantageous that, as a result of thermal treatment, volatile components such as fibre assistants are removed, giving a web having favourable fogging values, so that when a low-fogging adhesive is used, it is possible to produce an adhesive tape having particularly favourable fogging values; accordingly, the carrier as well has a very low fogging value.

Advantageously and at least in regions, the carrier may have a single-sidedly or double-sidedly polished surface, preferably in each case a surface polished over the whole area. The polished surface may be chintzed, as elucidated in detail in EP 1 448 744 A1, for example. Dirt repellency is hereby improved.

Starting materials for the carrier are more particularly (manmade) fibres (staple fibre or continuous filament) made from synthetic polymers, also called synthetic fibres, made from polyester such as polyethylene terephthalate, polyamide, polyimide, aramid, polyolefin, polyacrylonitrile or glass, (manmade) fibres made from natural polymers such as cellulosic fibres (viscose, Modal, Lyocell, Cupro, acetate, triacetate, Cellulon), such as rubber fibres, such as plant protein fibres and/or such as animal protein fibres and/or natural fibres made of cotton, sisal, flax, silk, hemp, linen, coconut or wool. The present invention, however, is not confined to the materials stated; it is instead possible, as evident to the skilled person without having to take an inventive step, to use a multiplicity of further fibres in order to produce the nonwoven.

Likewise suitable, furthermore, are yarns fabricated from the raw materials specified.

In the case of woven fabrics or scrims, individual threads may be produced from a blend yarn, and thus may have synthetic and natural constituents. Generally speaking, however, the warp threads and the weft threads are each formed of a single kind.

The warp threads and/or the weft threads here may in each case be composed only of synthetic threads or only of threads made from natural raw materials.

Preferred material used for the carrier is polyester or glass, more preferably polyester, owing to the outstanding ageing resistance and the outstanding resistance to media, namely with respect to chemicals and service fluids such as oil, fuel, antifreeze and similar. Polyester and glass, moreover, have the advantages that they lead to a very abrasion-resistant and temperature-stable carrier, which is particularly important for the specific utility for the bundling of cables in automobiles and, for example, in the engine compartment.

The basis weight of the textile carrier is advantageously between 30 g/m$^2$ and 300 g/m$^2$, more advantageously between 50 g/m$^2$ and 200 g/m$^2$, very advantageously between 60 g/m$^2$ and 150 g/m$^2$, especially advantageously between 70 g/m$^2$ and 100 g/m$^2$.

According to one particularly advantageous embodiment of the invention the carrier used is a woven or nonwoven polyester fabric which has a basis weight of between 60 g/m$^2$ and 150 g/m$^2$.

The adhesive tape, lastly, may have a liner material, with which the curative composition and especially the reactive composition are covered until the time of use and which is removed before the adhesive tape is used. Suitable liner materials include all of the materials set out comprehensively above.

Preference is given to using a non-linting material such as a polymeric film or a well-sized, long-fibre paper.

A liner (release paper, release film) is not part of an adhesive tape or label, but instead only an aid to its production, storage or further processing by diecutting. Furthermore, in contrast to an adhesive tape carrier, a liner is not firmly connected to a layer of adhesive.

Adhesive coating compositions are widely used for producing liners in the coating, particularly, of sheetlike materials such as papers or films, in order to reduce the tendency of adhering products to adhere to these surfaces.

If low flammability is desired in the adhesive tape described, it can be achieved by the addition to the carrier and/or to the composition of flame retardants. These retardants may be organobromine compounds, if necessary with synergists such as antimony trioxide, although, with a view to the absence of halogen from the adhesive tape, preference will be given to using red phosphorus, organophosphorus compounds, mineral compounds or intumescent compounds such as ammonium polyphosphate, alone or in conjunction with synergists.

The general expression "adhesive tape" for the purposes of this invention encompasses all sheet-like structures such as two-dimensionally extended sheets or sheet sections, tapes with extended length and limited width, tape sections and the like, lastly including diecuts or labels.

The adhesive tape may be produced in the form of a roll, in other words in the form of an archimedean spiral wound up onto itself.

The adhesive may be applied in the longitudinal direction of the adhesive tape, in the form of a stripe with a width lower than that of the adhesive tape carrier.

Depending on the specific utility, it is also possible for two or more parallel stripes of the adhesive to be coated on the carrier material. The position of the stripe on the carrier is freely selectable, with a disposition directly at one of the edges of the carrier being preferred.

If a certain fixing of the adhesive tape on the product is desired, the jacketing may be performed in such a way that the adhesive stripe bonds partly to the adhesive tape itself and partly to the product.

With further preference, when the adhesive tape is bonded to cables with PVC jacketing and to cables with polyolefin jacketing, the adhesive tape does not destroy that jacketing when an assembly of cables and adhesive tape is subjected in accordance with LV 312 to storage at temperatures above 100° C. for up to 3000 hours and the cable is subsequently bent around a mandrel. The adhesive tape of the invention is outstandingly suitable for the wrapping of cables, can be easily unwrapped for ease of processing, and exhibits no cable embrittlement even in the high temperature classes T3 and T4 over 3000 hours.

According to one preferred embodiment of the invention, the reactive composition takes the form of
   an adhesive composition
   a wet layer in solution or as a dispersion
   a composition embedded in a surface-coating material.

Particularly advantageous embodiments of the invention include the following adhesive tape variants:

According to another advantageous embodiment, the curative composition and/or reactive composition are furnished with diffusion mediators. The effect of these mediators is to bring about accelerated diffusion, or they act as a phase transfer reagent of the base or of the crosslinker. Typical, and advantageously selected, types are low molecular mass substances such as plasticizers, solvents and/or surfactants.

In a first preferred embodiment of the adhesive tape, the curing is accomplished at reduced deblocking temperature.

The curative composition consists of an adhesive acrylate composition with a low acrylic acid content, preferably free of acrylic acid. A typical acrylic acid-free adhesive acrylate composition is based on the monomers dihydroxyethyl acrylate, n-butyl acrylate and/or 2-ethylhexyl acrylate. It contains no acrylic acid. The adhesive acrylate composition may have been crosslinked in particular with isocyanates. The curative composition is modified with a crosslinker. The crosslinker comprises blocked isocyanates such as carbonate, urethanes, urea derivatives, isocyanates blocked with lactams or lactones, and malonic ester-blocked isocyanates. The fraction of the blocked isocyanates is preferably 0.5% to 1% by weight. An example is Dyhard 500 (Alzchem) with a deblocking temperature of about 100° C. Dyhard 500 is N,N"-(4-methyl-m-phenylene)bis[N',N'-dimethylurea].

Contact of the reactive composition with the curative composition leads to a reduction in the deblocking temperature of the curative agent, when using Dyhard 500, by about 40° C.

The reactive composition is modified with one or more non-nucleophilic bases; examples include 1,8-diazabicyclo[5.4.0]undec-7-ene (DBU), 1,4-diazabicyclo[2.2.2]octane (DABCO) and 1,5-diazabicyclo[4.3.0]non-5-ene (DBN).

The reactive composition here may be actualized in different versions.
   In the first version, an adhesive composition of low acrylic acid content, preferably free from acrylic acid, with 1% to 2% by weight of the bases, forms the reactive composition. The adhesive acrylate compositions of the curative composition and of the reactive composition may be identical (apart from the differences stated). Since both the bases and the crosslinker are able to migrate, both the curative composition and the reactive composition are cured.
   In the second version, the reactive composition takes the form of a wet layer; in other words, the bases are in solution in solvents such as acetone or ethyl acetate, with the fraction of the bases in the wet layer being preferably between 15% and 30% by weight, more preferably between 20% and 25% by weight. Application of the wet layer takes place either by wetting of the substrate before the adhesive tape is applied, or by wetting of the permeable textile carrier of the adhesive tape. The solvents here drive forward the migration of the bases into the curative composition, by softening the curative composition.
   In the third version, the reactive composition takes the form of a layer of surface-coating material. An extremely soft surface-coating material is preferred. With a soft surface-coating material, the glass transition temperature is below the service temperature, in other words in general below room temperature or below 0° C. The fraction of the bases in the surface-coating material is preferably between 5% and 15% by weight, more preferably between 10% and 12% by weight.

In a second preferred embodiment of the adhesive tape, curing takes place via an acid-base reaction. Heat treatment is not mandatory for the crosslinking reaction, but can be used in order to accelerate the migration and hence the crosslinking.

The contact of the curative composition with the reactive composition results in an acid-base reaction. In the reactive composition, the bases or acids are present in unbound form, and so are able to penetrate the curvative composition and thus lead to full curing of the curative composition.

With this embodiment (acid-base mechanism) there are various possible combinations.

The curative composition may be an acid curative composition, preferably an acrylic acid-rich adhesive acrylate composition. The acrylic acid content is between 3% and 12% by weight.

The reactive composition in that case is a base reactive composition, preferably isophoronediamine, Epikure 925 (triethylenetetraamine), Jeffcat Z130, Jeffcat ZF10. In the base reactive composition, there is migration of a molecule having at least two basic functionalities per molecule.

In the opposite case, the base curative composition is preferably a basic adhesive acrylate composition, consisting of a copolymer with 3% by weight of N,N-dimethylaminopropyl acrylate, 87% by weight of butyl acrylate and 10% by weight of ethylhexyl acrylate. The basic adhesive acrylate composition may further comprise up to 50% by weight, preferably up to 30% by weight, of a tackifier resin, as for example Dertophene T105, a terpene-phenolic resin. If a tackifier resin is present in the adhesive bonding composition, there are corresponding reductions in the proportions of N,N-dimethylaminopropyl acrylate, butyl acrylate and ethylhexyl acrylate.

The reactive composition is then an acid reactive composition, as for example maleic acid, fumaric acid, oxalic acid, citric acid. In the acid reactive composition there is migration of a molecule having at least two acidic functionalities per molecule.

The reactive composition may also take the form of the above-outlined wet layer. The solvents in this case drive forward the migration of the base into the curative composition, by softening the curative composition.

The reactive composition may also be present in the form of the above-outlined layer of surface-coating material.

In a third preferred embodiment of the adhesive tape, curing takes place via an epoxy-amine reaction. Heat treatment is not mandatory for the crosslinking reaction, but can be used in order to accelerate the migration and hence the crosslinking.

Contact of the curative composition with the reactive composition leads to an epoxide-amine reaction. In the reactive composition the epoxides and amines are in unbound form, and so are able to penetrate the curative composition and thus lead to full curing of the curative composition.

With this embodiment as well there are different possible combinations.

The curative composition may be an epoxy curative composition, preferably an epoxide-containing adhesive acrylate composition based on n-butyl acrylate and/or 2-ethylhexyl acrylate, acrylic acid and glycidyl methylacrylate (preferably present at 1% to 5% by weight, more preferably at 2% by weight). The reactive composition may be an amine-containing composition, preferably Epikure 925, isophoronediamine or 1,6-hexanediamine.

In the opposite case, the curative composition is an amine curative composition, preferably an amine-containing adhesive acrylate composition, more preferably consisting of a copolymer with 3% by weight of N,N-dimethylaminopropyl acrylate, 87% by weight of butyl acrylate and 10% by weight of ethylhexyl acrylate. The basic adhesive acrylate composition may further comprise up to 50% by weight, preferably up to 30% by weight, of a tackifier resin, for example Dertophene T105. If a tackifier resin is present in the adhesive composition, there are corresponding reductions in the fractions of N,N-dimethylaminopropyl acrylate, butyl acrylate and ethylhexyl acrylate.

The reactive composition in that case is an epoxide-containing composition, as for example pentaerythritol tetraglycidyl ether (Polypox R16), polypropylene glycol diglycidyl ether (Polypox R19), trimethylolpropane triglycidyl ether (Polypox R20) or Epikote 828, a bisphenol A epoxide.

The reactive composition may also take the form of the above-outlined wet layer. The solvents in this case drive forward the migration of the base into the curative composition, by softening the curative composition.

The reactive composition may also take the form of the above-outlined layer of surface-coating material.

Epoxy resins are typically understood to include both monomeric and oligomeric compounds having more than one epoxy group per molecule. These compounds may be reaction products of glycidyl esters or epichlorohydrin with bisphenol A or bisphenol F or mixtures of these two. Likewise possible for use are epoxy novolak resins obtained by reacting epichlorohydrin with the reaction product of phenols and formaldehyde. Monomeric compounds having two or more epoxide end groups, which are employed as diluents for epoxy resins, can also be used. It is likewise possible to employ elastically modified epoxy resins.

Examples of epoxy resins are Araldite® 6010, CY-281, ECN 1273, ECN 1280, MY 720, RD-2 from Ciba Geigy, DER® 331, 732, 736, DEN 432 from Dow Chemicals, Epon® 812, 825, 826, 828, 830 etc. from Shell Chemicals, HPT 1071, 1079 likewise from Shell Chemicals, and Bakelite® EPR 161, 166, 172, 191, 194 etc. from Bakelite AG.

Commercial aliphatic epoxy resins are, for example, vinylcyclohexane dioxides such as ERL-4206, 4221, 4201, 4289 or 0400 from Union Carbide Corp.

Elasticized epoxy resins are available from Noveon under the name Hycar.

Monomeric compounds having two or more epoxide groups, are, for example, Bakelite® EPD KR, EPD Z8, EPD HD, EPD WF, etc. from Bakelite AG, or Polypox® R 9, R12, R 15, R 19, R 20 etc. from UCCP.

Commercially available chemicals used

| Chemical compound | Trade name | Manufacturer | CAS No. |
| --- | --- | --- | --- |
| Tackifier resin based on terpenephenol (softening point 105° C., hydroxyl value 30-60) | Dertophene ® T105 | DRT, France | 73597-48-5 |
| N,N,N'-Trimethyl-N'-hydroxyethyl bisaminoethyl ether | Jeffcat ® ZF-10 | Huntsman | 83016-70-0 |
| N'-(3-(Dimethylamino)propyl)-N,N-dimethyl-1,3-propanediamine | Jeffcat ® Z-130 | Huntsman | 6711-48-4 |

All specification figures at 20° C.;

According to one advantageous embodiment of the invention the adhesive compositions outlined above are self-adhesive.

The adhesive tape can then be used to bundle cables, and/or the adhesive tape can be affixed to the cable loom by spiral wrapping without further aids.

A self-adhesive composition, also called pressure-sensitive adhesive, is an adhesive composition which even under relatively weak applied pressure, permits durable bonding to virtually all substrates and which, after service, can be detached from the substrate again substantially without residue. At room temperature, a pressure-sensitive adhesive has a permanent pressure-sensitive adhesion effect—that is, it exhibits a sufficiently low viscosity and a high initial tack, and so it wets the surface of the respective substrate under just low applied pressure. The bondability of the adhesive composition derives from its adhesive properties, and the redetachability from its cohesive properties.

The stiffness of the cable loom can be increased by means of a self-adhesive composition because the adhesive composition as well bonds to the cables of the cable loom and so fixes their position relative to one another and to the surrounding (already stiff) carrier.

Tackifying resins to be added that can be used include without exception all tackifier resins already known and described in the literature. Those preferentially suitable include non-hydrogenated, partially hydrogenated or fully hydrogenated resins based on indene, rosin and rosin derivatives, hydrogenated polymers of dicyclopentadiene, non-hydrogenated or partially, selectively or fully hydrogenated hydrocarbon resins based on $C_5$, $C_5/C_9$ or $C_9$ monomer streams, polyterpene resins based on α-pinene and/or β-pinene and/or δ-limonene, or hydrogenated polymers of preferably pure $C_8$ to $C_9$ aromatics.

Any desired combinations of these and further resins may be used in order to adjust the properties of the resultant composition in line with requirements. Generally speaking, it is possible to use all resins that are compatible (soluble) with the polymer in question. Express reference is made to the detailing of the state of knowledge in the "Handbook of Pressure Sensitive Adhesive Technology" by Donatas Satas (van Nostrand, 1989).

Further additives which can typically be utilized include the following:
  primary antioxidants such as, for example, sterically hindered phenols
  secondary antioxidants such as, for example, phosphites or thioethers
  process stabilizers such as, for example, C radical scavengers
  light stabilizers such as, for example, UV absorbers or sterically hindered amines
  processing assistants
  fillers such as, for example, silicon dioxide, glass (ground or in the form of beads), aluminium oxides, zinc oxides, calcium carbonates, titanium dioxides, carbon blacks, metal powders, etc
  colour pigments and dyes and also optical brighteners.

Through the use of plasticizers it is possible to increase the elasticity of the crosslinked composition. Plasticizers which can be used in the context include for example low molecular mass polyisoprenes, polybutadienes, polyisobutylenes or polyethylene glycols and polypropylene glycols, or plasticizers based on polyethylene oxides, phosphate esters, aliphatic carboxylic esters and benzoic esters. It is also possible, furthermore, to employ aromatic carboxylic esters, diols of relatively high molecular mass, sulphonamides and adipic esters.

It is additionally possible optionally to add fillers (for example fibres, carbon black, zinc oxide, titanium dioxide, chalk, hollow or solid glass beads, microbeads of other materials, silica, silicates), nucleators, expandants, bond strength booster additives and thermoplastics, compounding agents and/or ageing inhibitors, in the form for example of primary and secondary antioxidants or in the form of light stabilizers.

The thickness of the applied curative and/or reactive composition is preferably between 50 μm and 500 μm, more advantageously between 100 μm and 250 μm, particularly advantageously between 100 μm and 200 μm.

In one version of the method of the invention for jacketing elongate materials such as more particularly leads or cable looms, an adhesive tape system is used which is composed of a first adhesive tape comprising a carrier, more particularly a textile carrier, with a curative composition applied to its top side, and a second adhesive tape comprising a carrier, more particularly a textile carrier, with a reactive composition applied to its bottom side.

The first and second adhesive tapes are passed in a helical line around the elongate material or wrap the elongate material in the axial direction in such a way that the curative composition of the first adhesive tape comes into contact with the reactive composition of the second adhesive tape.

The elongate material together with the adhesive tape wrappings is brought into the desired disposition, more particularly into the cable loom layout, and the elongate material is held in this disposition.

Since the curative composition reacts with the reactive composition, a curing layer of composition is produced.

One of the adhesive tapes in this case is wound in such a way that the carrier is in contact with the material by its uncoated side, so that the curative composition and/or the reactive composition point outwards. In that case the other adhesive tape is wound in such a way that curative composition and reactive composition lie on top of one another, so that the uncoated side of the other adhesive tape points outwards.

The second winding preferably takes place, like the first winding, in the form of a helical line, preferably with an offset. This winding may take place in the same direction as the first winding, in other words likewise from left to right, but may alternatively take place in the opposite direction.

A further version of the invention encompasses a jacketing which consists of a covering where a first adhesive tape is present in an edge region of the covering and is adhered on the covering in such a way that the first adhesive tape extends over one of the longitudinal edges of the covering, preferably in an edge region which is narrow by comparison with the width of the covering. The first adhesive tape in this case consists of a preferably textile carrier on which the curative composition or the reactive composition is applied.

In the edge region of the covering, and specifically at the opposite longitudinal edge, the jacketing has a second adhesive tape, which is adhered on the covering in such a way that the adhesive tape extends over the other of the two longitudinal edges of the covering, preferably likewise in an edge region which is narrow by comparison with the width of the covering. The second adhesive tape in this case consists of a preferably textile carrier, on which the reactive composition is applied if the first adhesive tape has the curative composition, or vice versa. It has emerged as outstanding if the first adhesive tape is arranged on the top face of the covering and the second adhesive tape is arranged on the bottom face of the covering.

The covering is preferably formed by a textile, of the type described comprehensively above.

The width of the covering is advantageously selected such that it largely matches the periphery of the material to be jacketed, in order as far as possible not to have a doubled ply of covering over the material.

If greater protection of the material or greater damping qualities are desired, the covering may have a very much greater width than that corresponding to the periphery of the material to be jacketed, in order to achieve double or triple wrapping of the material, for example.

The adhesive tape or tapes preferably have widths of between 10 and 50 mm, more preferably 15 to 25 mm.

The width of the covering preferably corresponds at least to the width of the two adhesive tapes; with further preference the covering is at least 1.5 times as wide as the two adhesive tapes, more preferably at least twice.

For use with cable looms which find use in automobile construction, widths of 80, 105 and 135 mm are particularly advantageous for the covering, but may also be produced variably according to the specific application; the length is guided by the architecture of the cable loom.

The jacketing is to be used in turn advantageously for the jacketing of elongate material, such as cable looms in particular, with the elongate material being wrapped in the axial direction by the covering.

For the embodiment with double-edge provision of adhesive tape, the wrapping of the material is accomplished by placing the first adhesive tape in the axial direction of the material on the material in such a way that the uncoated side of the adhesive tape is facing the material. The material is then enclosed with the covering in a circular motion.

Lastly, the second adhesive tape is pressed by its coated side onto the coated side of the first adhesive tape, causing the curative composition and the reactive composition to come into contact and cure.

Jacketing of this kind and also optimized embodiments thereof are disclosed in EP 1 312 097 A1. EP 1 300 452 A2, DE 102 29 527 A1, WO 2006/108871 A1, EP 1 367 608 A2, EP 1 315 781 A1 and DE 103 29 994 A1 describe variants or ongoing developments.

In the text below, the aim is to elucidate the adhesive tape in more detail, by way of example, using a number of figures, without the invention being confined to these embodiments.

BRIEF DESCRIPTION OF THE DRAWINGS

In the drawings:

FIG. 1 shows in section in the transverse direction (transverse section) the adhesive tape 3, which consists of a nonwoven carrier 31, the top side of which bears a curative composition 32 and the bottom side of which bears a reactive composition 33.

Figure 1:
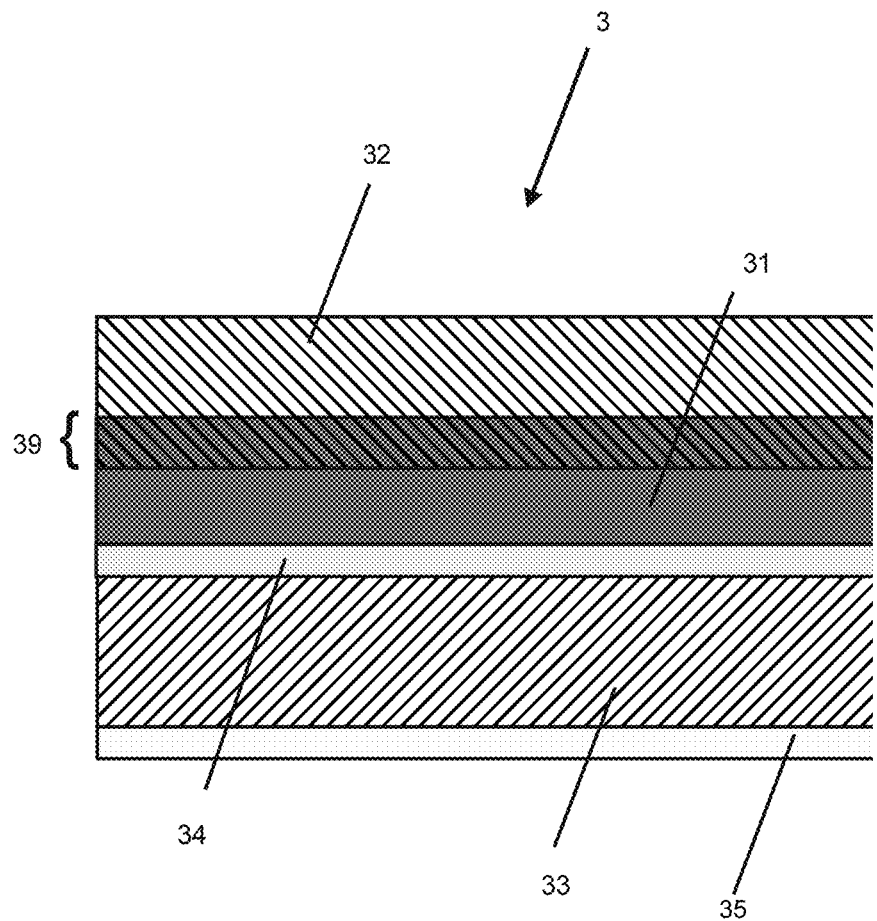
FIG. 1 shows the adhesive tape according to a first advantageous embodiment in lateral section.

The curative composition 32 has sunken into the carrier 31 to an extent of 25%, thereby producing optimum anchorage (39).

Between carrier 31 and reactive composition 33 there is a release film 34 present. Furthermore, reactive composition 33 is lined on its free side with a liner 35.

Both curative composition 32 and reactive composition 33 have been applied over the entire width of the carrier 31, in other words over the full area.

Figure 2:
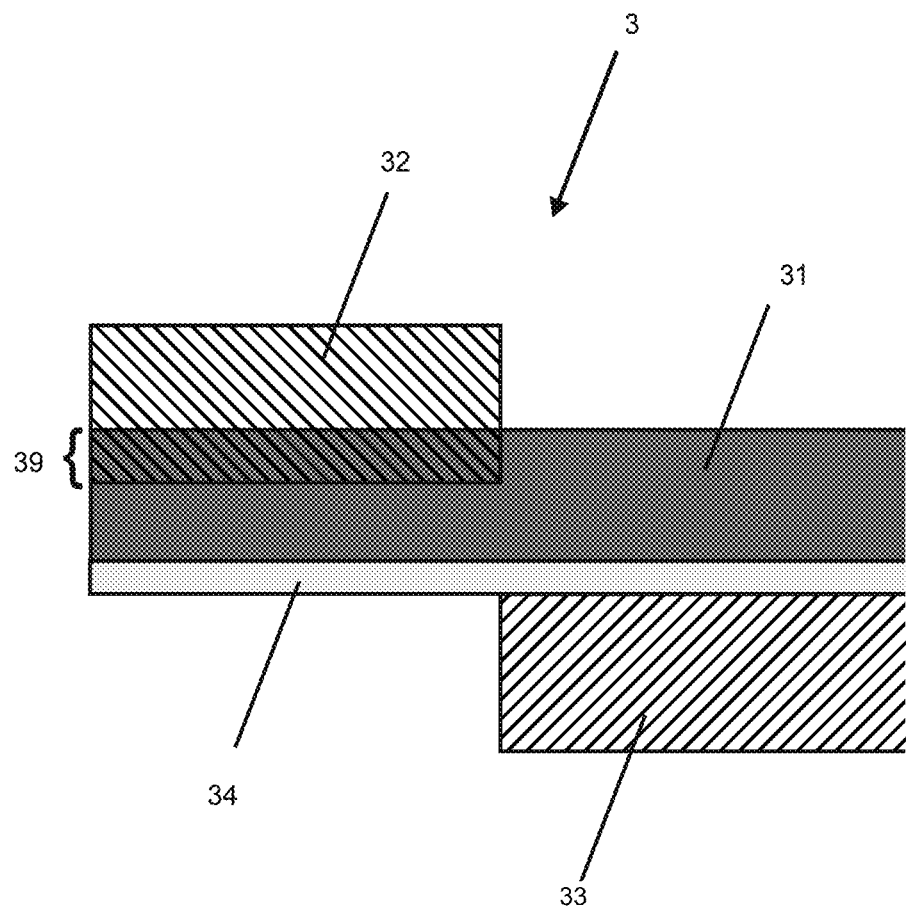
FIG. 2 shows the adhesive tape according to a second advantageous embodiment in lateral section.

FIG. 2 shows in section in the transverse direction (transverse section) another version of the adhesive tape 3, consisting of a nonwoven carrier 31 whose top face bears a curative composition 32 and whose bottom face bears a reactive composition 33.

The curative composition 32 has sunken into the carrier 31 to an extent of 25%, thereby producing optimum anchorage (39).

Between carrier 31 and reactive composition 33 there is a release film 34 present. The release film extends over the entire width of the carrier 31.

Both curative composition 32 and reactive composition 33 are applied in the form of a stripe. The stripe of curative composition 31 extends from one longitudinal edge of the carrier 31 to the middle of the carrier 31. The stripe of the reactive composition 33 extends from the opposite edge of the carrier 31 to the middle of the carrier 31.

Figure 3:
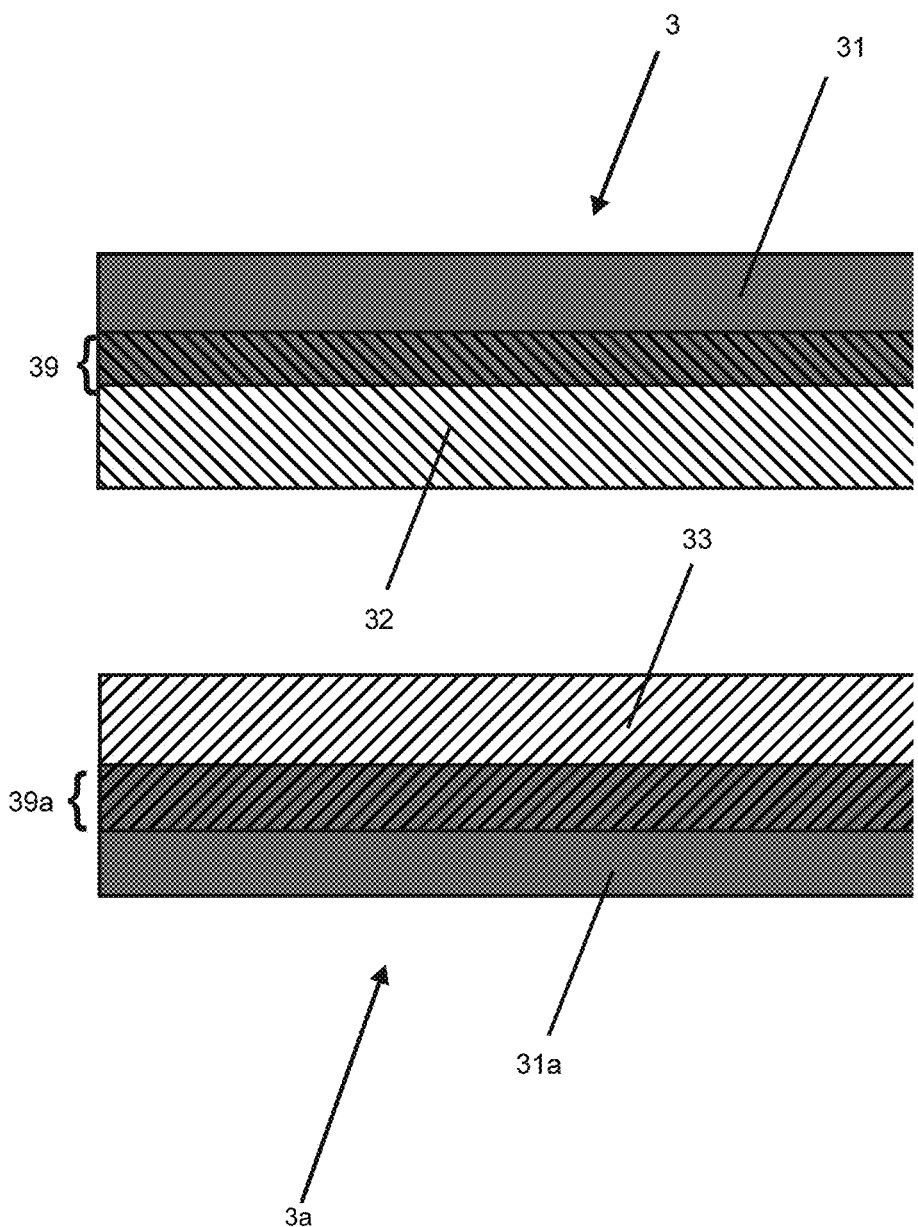
FIG. 3 shows a version of the invention in which two adhesive tapes are used.

FIG. 3 shows an alternative of the method of the invention for the jacketing of elongate material. For this purpose, an adhesive tape system is used which is composed of a first adhesive tape 3, comprising a textile carrier 31 whose top face bears a curative composition 32, and a second adhesive tape 3a comprising a textile carrier 31a whose bottom face bears a reactive composition 33.

Both curative composition 32 and reactive composition 33 have each sunken into the carriers 31, 31a to an extent of 25%, thereby producing optimum anchorage (39, 39a).

The first adhesive tape 3 and the second adhesive tape 3a are passed in a helical line around the elongate material, or envelop the elongate material in the axial direction, in a manner such that the curative composition 32 of the first adhesive tape 3 comes into contact with the reactive composition 33 of the second adhesive tape 3a.

One of the adhesive tapes 3, 3a here is wound such that the carrier 31, 31a is in contact with the material by its uncoated side, so that the curative composition 32 and/or the reactive composition 33 point outwards. The other adhesive tape 3, 3a is then wound in such a way that curative composition 32 and reactive composition 33 lie on top of one another, so that the uncoated side of the other adhesive tape 3, 3a points outwards.

Figure 4:
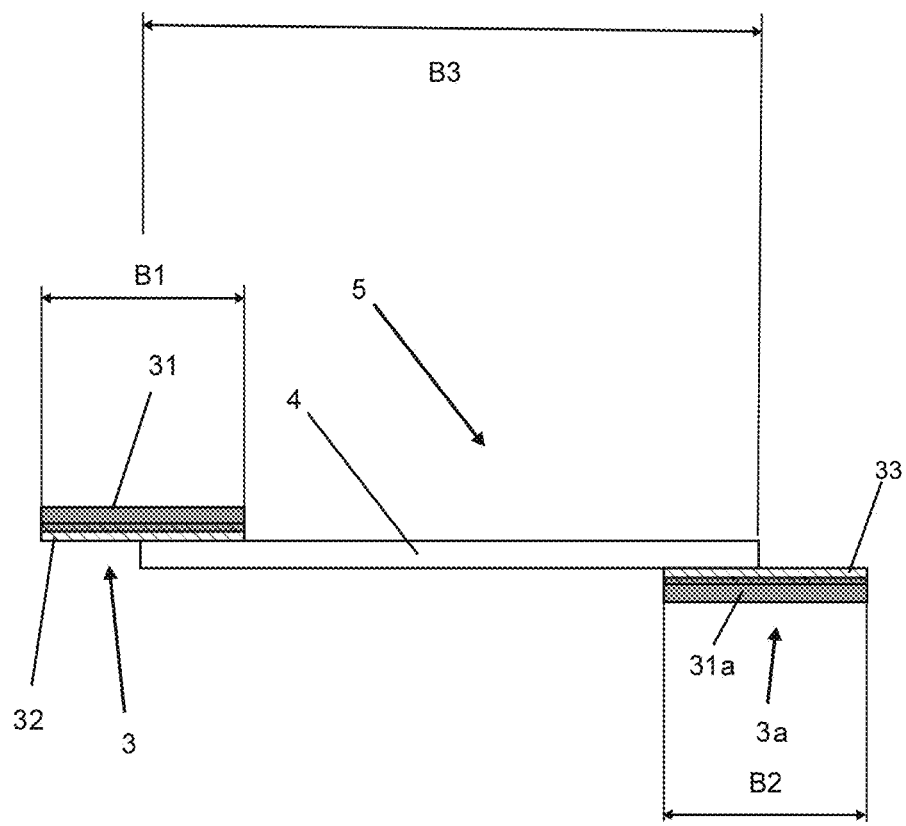
FIG. 4 shows a variant of the invention in which two adhesive tapes and one covering are used.

FIG. 4 represents a further version of the invention. This version embraces a jacketing 5 consisting of a covering 4 where there is a first adhesive tape 3 present in an edge region of the covering 4, this adhesive tape 3 being bonded on the covering 4 in such a way that the first adhesive tape 3 extends over one of the longitudinal edges of the covering 4, specifically in an edge region which is narrow by comparison with the width of the covering 4. This first adhesive tape 3 consists of a textile carrier 31, to which the curative composition 32 is applied.

In the edge region of the covering 4, and specifically at the opposite longitudinal edge, the jacketing has a second adhesive tape 3a, which is bonded on the covering 4 in such a way that the adhesive tape 3a extends over the other of the two longitudinal edges of the covering 4, likewise in an edge region which is narrow by comparison with the width of the covering 4. The second adhesive tape 3a likewise consists of a textile carrier 31a bearing the reactive composition 33.

The width (B3) of the covering 4 is greater by a factor of 1.5 than the sum total of the widths (B1, B2) of the adhesive tapes 3, 3a.

Figure 5:
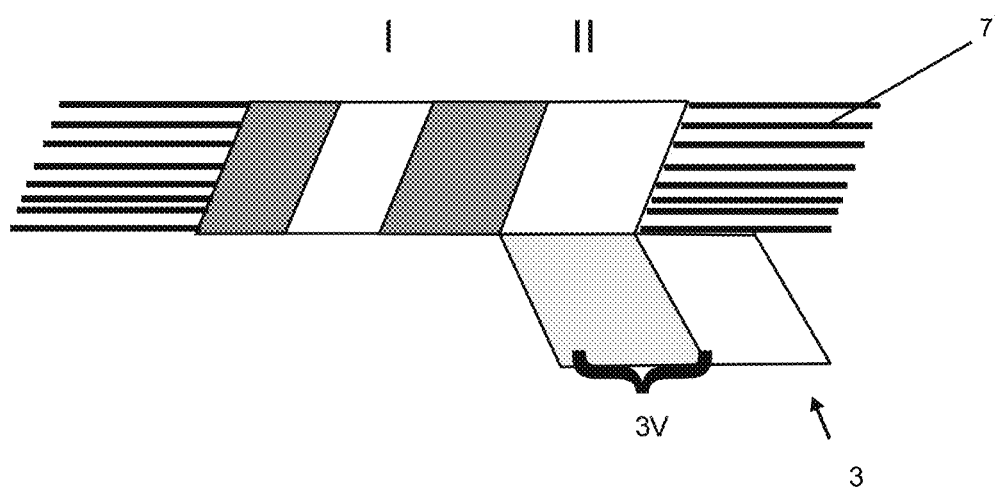
FIG. 5 shows a detail of a cable loom which is composed of a bundle of individual cables and is jacketed with the adhesive tape of the invention.

FIG. 5 shows a detail of a cable loom which is composed of a bundle of individual cables 7 and which is jacketed with the adhesive tape 3 of the invention, here depicted in simplified form, according to the version described in FIG. 1. The adhesive tape 3 is passed in a spiral movement around the cable loom.

The detail of the cable loom that is shown shows two turns I and II of the adhesive tape 3. Further turns would extend to the left; these turns have not been shown here.

The wrapping of the adhesive tape 3 takes place with an offset 3V of 50%, which in this figure is indicated by the darker colour.

The invention claimed is:

1. A method for jacketing elongate material, said method comprising:
   (A) providing an adhesive tape comprising a carrier having a curative composition applied to its top side and a reactive composition applied to its bottom side, the adhesive tape further comprising a release film between the carrier and the reactive composition,
   (B) passing said adhesive tape in a helical line around the elongate material or wrapping the elongate material in the axial direction with the adhesive tape in such a way that the curative composition and the reactive composition come into contact,
   (C) bringing the elongate material together with the adhesive tape wrapping into a desired disposition,
   (D) holding the elongate material in this disposition, and
   (E) reacting the curative composition with the reactive composition to produce a curing layer of composition.

2. Method according to claim 1,
wherein
the curative composition and/or the reactive composition, following application to the carrier, have sunken into the carrier to an extent of more than 10%.

3. Method according to claim 1,
wherein
the curative composition and/or the reactive composition, following application to the carrier, completely saturate the carrier.

4. Method according to claim 1,
wherein
the carrier has a basis weight of 30 to 250 g/m.

5. Method according to claim 1,
wherein
the carrier is a textile carrier.

6. Method according to claim 5,
wherein
the textile carrier consists of polyester or of glass fibers.

7. Method according to claim 1,
wherein
the reactive composition takes the form of
(A) an adhesive composition;
(B) a wet layer in solution or as a dispersion; or
(C) a composition embedded in a surface-coating material.

8. Method according to claim 1,
wherein
the reacting the curative composition with the reactive composition to produce a curing layer of composition involves curing at reduced deblocking temperature, or an acid-base reaction not requiring heating, or an epoxy-amine reaction not requiring heating.

* * * * *